United States Patent
Sewaki

(10) Patent No.: US 8,131,418 B2
(45) Date of Patent: Mar. 6, 2012

(54) ANGULAR VELOCITY CALCULATING DEVICE, OFFSET DETERMINATION METHOD FOR THE SAME, AND VEHICLE STOPPING DETECTING DEVICE

(75) Inventor: Koji Sewaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1311 days.

(21) Appl. No.: 11/756,950

(22) Filed: Jun. 1, 2007

(65) Prior Publication Data
US 2008/0027601 A1  Jan. 31, 2008

(30) Foreign Application Priority Data

Jul. 31, 2006  (JP) .................. 2006-207619

(51) Int. Cl.
*G01C 19/00*  (2006.01)
(52) U.S. Cl. ........................ 701/29.1; 340/576
(58) Field of Classification Search .............. 701/29, 701/35, 36, 25, 207, 29.1, 29.6, 31.1, 400, 701/408, 33.1; 340/870.03, 439, 576; 73/1.77, 73/504.12, 504.16, 504.02, 504.01; 702/104, 702/146, 145
See application file for complete search history.

(56) References Cited

U.S. PATENT DOCUMENTS

| | | | |
|---|---|---|---|
| 5,390,123 A * | 2/1995 | Ishikawa | 701/207 |
| 5,644,082 A * | 7/1997 | Iwata et al. | 73/504.03 |
| 5,935,191 A | 8/1999 | Sakanashi et al. | |
| 6,721,645 B2 * | 4/2004 | Lueder et al. | 701/93 |
| 7,079,927 B1 * | 7/2006 | Tano et al. | 701/35 |
| 7,359,776 B2 * | 4/2008 | Souda | 701/34 |
| 7,565,260 B2 * | 7/2009 | Yun et al. | 702/151 |

FOREIGN PATENT DOCUMENTS

| | | |
|---|---|---|
| JP | 05-052578 | 3/1993 |
| JP | 05-306936 | 11/1993 |
| JP | 07-218276 | 8/1995 |
| JP | 08-178687 | 7/1996 |
| JP | 9-96535 | 4/1997 |
| JP | 10-132849 | 5/1998 |
| JP | 2000-65849 | 5/2000 |
| JP | 2001-124584 | 5/2001 |

* cited by examiner

*Primary Examiner* — Dalena Tran
(74) *Attorney, Agent, or Firm* — Brinks Hofer Gilson & Lione

(57) ABSTRACT

Minimum and maximum values of an angular velocity signal output from a gyro while a vehicle is stationary are detected. A range of the angular velocity signal is set that is used to determine when the vehicle is stationary. When the angular velocity signal output from the gyro exceeds the range, the vehicle starts to move, offset values calculated within a set time from a movement start detection time are discarded, and an average angular velocity signal having been calculated and stored the set time before, is output as the offset value. Thus, even when the vehicle does not have a vehicle speed sensor, the stopping and starting of the movement of the vehicle can be accurately detected using the output signal from the gyro and the accurate offset value can be output.

13 Claims, 13 Drawing Sheets

FIG. 11
| t [s] | $\Omega_{THR}$ [deg/s] |
|---|---|
| 0 – 5 | 0.2 |
| 5 – 10 | 0.4 |
| 10 – 60 | 0.8 |
| 60 – 300 | 1.2 |
| 300 – | NO LIMIT |
FIG. 12A
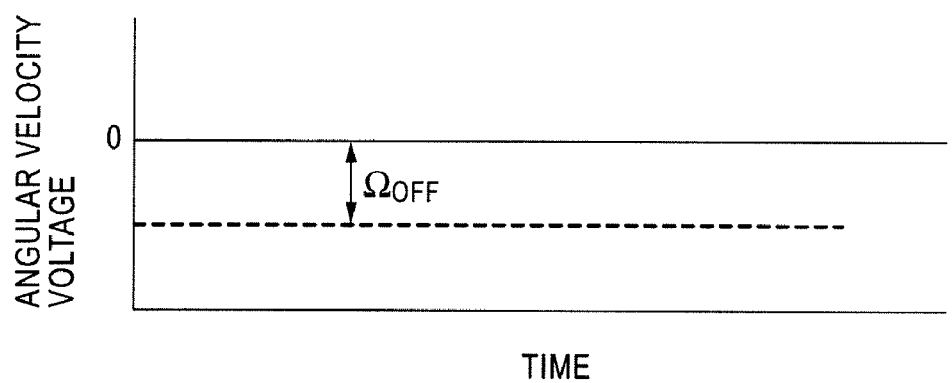
FIG. 12B
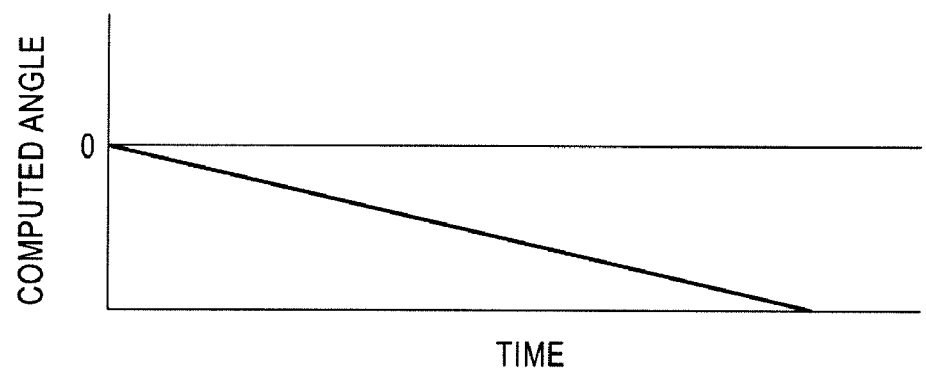

RUNNING AT LOW SPEED

TURNING OF TURNTABLE

ANGULAR VELOCITY CALCULATING DEVICE, OFFSET DETERMINATION METHOD FOR THE SAME, AND VEHICLE STOPPING DETECTING DEVICE

RELATED APPLICATIONS

The present application claims priority to Japanese Patent Application Serial Number 2006-207619, filed Jul. 31, 2006, the entirety of which is hereby incorporated by reference.

BACKGROUND OF THE INVENTION

1. Field of the Invention

The present invention relates to angular velocity calculating devices, offset determination methods for the same, and vehicle stopping detecting devices. In particular, the present invention relates to an angular velocity calculating device, an offset determination method for the same, and a vehicle stopping detecting device for averaging angular velocity signals output from a gyroscope (gyro) while a vehicle is stationary to calculate an offset value, and canceling the offset value from an angular velocity signal output while the vehicle is moving to output angular velocity.

2. Description of the Related Art

Angular velocity calculating devices for calculating a rotation angle of a vehicle using signals corresponding to the angular velocity output from a gyro installed on the vehicle are known. In such angular velocity calculating device, as shown in FIG. 12A, the level of the signal output from the gyro includes an offset voltage ($\Omega_{off}$) such that the level of the signal output from the gyro is not equal to zero even when the vehicle is stationary. For this reason, even when the vehicle is stationary, a calculated rotation angle does not become zero, but increases as shown in FIG. 12B. Accordingly, an angular velocity calculating device for averaging angular velocity signals output from a gyro while a vehicle is stationary may calculate an offset value and cancel the offset value from an angular velocity signal that is output while the vehicle is moving to output an angular velocity as suggested in Japanese Unexamined Patent Application Publication No. 5-306936. In such an angular velocity calculating device, it is necessary to accurately measure the offset value when the vehicle is stationary. In addition, generally, a vehicle speed sensor for generating a pulse for every predetermined travel distance must be installed on the vehicle. Whether or not the vehicle is stationary is then detected on the basis of an interval between the generated vehicle speed pulses.

However, there are cases where an offset value cannot be accurately measured when a vehicle is stationary such as when a vehicle starts to move while a steering wheel is turned. When the vehicle starts to move while the steering wheel is turned, the vehicle travels about 40 to 80 centimeters until the movement of the vehicle is detected as the first vehicle speed pulse P is generated as shown in FIG. 13A. During this time, as shown in FIG. 13B, small angular velocity Ω is output. In a known technique, a wrong offset value is fetched as the point of zero using the angular velocity. Accordingly, a method for averaging gyro output signals at predetermined time intervals to calculate offset values (see, black dots) when a vehicle is stationary, and fetching an offset B calculated a predetermined time Ta before a time point of detection of the movement of the vehicle instead of an offset A calculated immediately before the time point has been suggested in Japanese Unexamined Patent Application Publication No. 5-52578. According to this second known method, an accurate offset value can be obtained.

However, in the second known method, a wrong offset value may be undesirably fetched when the vehicle travels at a low speed, or fetching of a wrong offset value while a turntable on which the vehicle is placed is turning cannot be prevented.

If a vehicle turns gradually at a low speed, a gyro outputs a weak angular velocity signal. However, in a vehicle using a vehicle speed sensor having an insensible zone at a low-speed area, the vehicle speed sensor does not generate vehicle speed pulses when the vehicle travels at a low speed of 1 to 2 km/h. Accordingly, an angular velocity calculating device determines that the vehicle is stationary and calculates an offset value using the weak angular velocity signals. For this reason, since the angular velocity calculating device performs measurement of the direction of the vehicle using the wrong offset value while the vehicle is traveling, accurate direction measurement cannot be made. For example, as shown in FIG. 14, there is a case where a vehicle travels at a low speed after the speed slightly increases temporarily, and the vehicle speed pulse is generated at the time the vehicle starts to move. In such a case, it is impossible to accurately measure the direction using the second known technique.

In addition, in a parking lot equipped with a turntable, since angular velocity is stabilized at a constant level for several seconds, if a turntable smoothly turns as shown in FIG. 15, an angular velocity calculating device determines that a vehicle is in a stationary state and calculates a wrong offset value, which prevents the accurate measurement of the direction.

Additionally, the second known technique is designed to detect the stopping and starting of movement of the vehicle using a vehicle speed sensor. Thus, the second known technique cannot be applied to vehicles not equipped with vehicle speed sensors, and vehicles equipped with vehicle speed sensors may not generate vehicle speed pulses at a low speeds. There are many vehicles made in Europe incapable of physically deriving vehicle speed pulses. In addition, even in vehicles capable of detecting the vehicle speed pulses, the vehicle speed pulses are often used in an antilock brake system. Further, there are vehicles incapable of detecting vehicle speed pulses if the vehicles travel at a low speed of 4 to 5 km/h. Accordingly, detecting the stopping and starting of movement of a vehicle on the basis of a noise level of an output signal of a gyro, such as in Japanese Unexamined Patent Application Publication No. 2000-65849, and then applying the second known technique is considered. However, in a third known technique, it is impossible to accurately detect the stopping and starting of movement of the vehicle and to obtain an accurate offset value, reasons of which will be described below.

Noises superimposed on gyro output signals while a vehicle is stationary include: (1) gyro noises; (2) noises output from a combination of an engine, a transmission, and a body on the vehicle side; and (3) noises output from a navigation equipment. As shown in FIGS. 16A and 16B, the first gyro noises significant vary for each individual gyro. In addition, occurrence of the second noises differs for each model of vehicle, and also differs depending on whether a gearshift lever is shifted into a neutral state or a drive state. For the above reasons, in the third known technique, as shown in FIG. 17, a variation range on the basis of whether the vehicle is considered to be stationary, i.e., a stationary range between TH1 and TH1, is determined in accordance with the individual piece having the greater noise level and the worst noise state. However, in such a stationary range setting method, a start of movement of a vehicle cannot be detected accurately, and a wrong offset A or B is fetched when the vehicle is slightly turning at the time the vehicle starts to move. As a result, a measurement error of the vehicle direction is caused during movement, and a mismatch is caused in map matching of the navigation control or a circumstance in which a vehicle mark is deviated from a road occurs. When an offset error is 5 mV, the error is equivalent to 0.2 [deg/s]. Thus, an angle error can become 0.2×5×60=60 [deg] for five minutes.

SUMMARY OF THE INVENTION

Accordingly, it is an object of the present invention to prevent a wrong offset value from being fetched when a vehicle employing a vehicle speed sensor having an insensible zone at a low-speed area travels at a low speed. It is another object of the present invention to prevent a wrong offset value from being fetched when a vehicle is turning on a turntable. It is still another object of the present invention to accurately detect stopping and starting of movement of a vehicle using a gyro output signal even when the vehicle is not equipped with a vehicle speed sensor, and to calculate an accurate offset value.

Angular Velocity Calculating Device

According to an aspect of the present invention, provided is an angular velocity calculating device for averaging an angular velocity signal output from a gyro while a vehicle is stationary to calculate an offset value, and for outputting angular velocity by canceling the offset value from an angular velocity signal output during movement of the vehicle.

An angular velocity calculating device according to a first embodiment of the present invention may include a stationary range determiner configured to detect a minimum value and a maximum value of an angular velocity signal for a predetermined period T1 while a vehicle is stationary and to determine a range of the angular velocity signal, wherein the range of the angular velocity signal is used to determine whether the vehicle is considered to be stationary; a stopping/starting determiner configured to determine that the vehicle starts to move when the angular velocity signal from the gyro exceeds the range and to determine that the vehicle is stationary when the angular velocity signal from the gyro is within the range; an angular velocity averager configured to calculate an average value of the angular velocity signal from the gyro at predetermined time intervals; an angular velocity storage configured to store the average angular velocity output from the angular velocity averager; and an offset value determiner configured to determine the angular velocity, having been stored a set time before a movement start detection time detected by the stopping/starting determiner, as the offset value.

The angular velocity calculating device according to the first embodiment may further include an angular velocity signal outputter configured to sample a voltage signal output from the gyro at predetermined intervals to determine rotation angles, and to add the rotation angles sampled for a predetermined number of times to output an angular velocity signal.

The stationary range determiner in the angular velocity calculating device according to the first embodiment may determine and update the range of the angular velocity signal, used to determine whether the vehicle is considered to be stationary, at time intervals T2 that is shorter than the predetermined period T1. In this case, the range where the vehicle is considered to be stationary may be a predetermined percentage greater than a range defined by the minimum value and the maximum value.

An angular velocity calculating device according to a second embodiment of the present invention may include a vehicle stop determiner configured to determine whether or not a vehicle is stationary on the basis of a vehicle speed pulse generated by a vehicle speed sensor; an angular velocity averager configured to calculate an average value of the angular velocity signal calculated from a gyro output signal at predetermined time intervals; and an offset fetcher configured to fetch and output the angular velocity output from the angular velocity averager as the offset value when a variation of the average angular velocity is within a set range and the vehicle is stationary and a difference between the angular velocity and the a previously fetched offset value is within an allowable range.

The angular velocity calculating device according to the second embodiment of the present invention may further include an angular velocity signal outputter configured to sample a voltage signal output from the gyro at predetermined intervals to determine rotation angles, and to add the rotation angles sampled for a predetermined number of times to output an angular velocity signal.

The angular velocity calculating device according to the second embodiment of the present invention may further include a correspondence table storage configured to store information on a correspondence between an elapsed time from a last offset fetch time and the allowable range, an elapsed time monitor configured to monitor the elapsed time, and an allowable range determiner configured to supply information on the allowable range corresponding to the elapsed time to the offset fetcher.

Vehicle Stopping Detection Device

According to another aspect of the present invention, provided is a vehicle stopping detection device for detecting when a vehicle stops. A vehicle stopping detection device according to an embodiment of the present invention may include a gyro configured to output an angular velocity signal of the vehicle; a stationary range determiner configured to detect a minimum value and a maximum value of the angular velocity signal for a predetermined period T1 while a vehicle is stationary and to determine a range of the angular velocity signal on the basis of which the vehicle is considered to be stationary; and a stopping/starting determiner configured to determine that the vehicle starts to move when the angular velocity signal from the gyro exceeds the stationary range and to determine that the vehicle is stationary when the angular velocity signal from the gyro is within the range.

The vehicle stopping detecting device according to the embodiment of the present invention may further include an angular velocity signal outputter configured to sample a voltage signal output from the gyro at predetermined intervals to determine rotation angles, and to add the rotation angles sampled for a predetermined number of times to output an angular velocity signal.

The stationary range determiner may determine and update the range of the angular velocity signal used to determine whether the vehicle is considered to be stationary at time intervals T2 that is shorter than the predetermined period T1. In this case, the range used to determine whether the vehicle is considered to be stationary may be a predetermined percentage greater than a range defined by the minimum value and the maximum value.

Offset Determination Method

According to still another aspect of the present invention, provided is an offset determination method for an angular velocity calculating device to average an angular velocity signal output from a gyro while a vehicle is stationary to calculate an offset value and to output an angular velocity by canceling the offset value from an angular velocity signal output during movement of the vehicle.

An offset determination method according to a first embodiment of the present invention may include the steps of detecting a minimum value and a maximum value of the angular velocity signal for a predetermined period T1 while the vehicle is stationary; determining a range of the angular velocity signal to determine whether the vehicle is considered to be stationary; determining that the vehicle starts to move when the angular velocity signal from the gyro exceeds the range; determining that the vehicle is stationary when the angular velocity signal from the gyro is within the range; calculating an average value of the angular velocity signal from the gyro at predetermined time intervals and storing the average value; and determining the angular velocity, having been stored a set time before a running start detection time, as the offset value.

The offset determination method according to the first embodiment of the present invention may further include the step of sampling a voltage signal output from the gyro at predetermined intervals to determine rotation angles, and adding the rotation angles sampled for a predetermined number of times to output an angular velocity signal of the gyro.

An offset determination method according to a second embodiment of the present invention includes the steps of determining whether or not the vehicle is stationary on the basis of a vehicle speed pulse generated by a vehicle speed sensor; calculating an average value of the angular velocity signal, calculated from the gyro output signal, at predetermined time intervals; and fetching and outputting the average angular velocity signal as the offset value when a variation of the average angular velocity is within a set range and the vehicle is stationary and a difference between the angular velocity and the previously fetched offset value is within an allowable range.

The offset determination method according to the second embodiment of the present invention may further include the step of sampling a voltage signal output from the gyro at predetermined intervals to determine rotation angles, and adding the rotation angles sampled for a predetermined number of times to output an angular velocity signal.

The offset determination method according to the second embodiment may further includes the step of storing a correspondence table containing a correspondence between an elapsed time from a last offset fetch time and the allowable range; monitoring the elapsed time; and determining the allowable range corresponding to the elapsed time from the correspondence table.

According to one aspect of the present invention, the minimum and maximum values of the angular velocity signals output when the vehicle is stationary are detected. The range of the angular velocity signal to determine whether the vehicle is considered to be stationary is set. When the angular velocity signal output from the gyro exceeds the range, the vehicle is determined to start moving. The average angular velocity signal having been calculated and stored a set time before the movement start detection time is output as the offset value. Thus, even when the vehicle does not have the vehicle speed sensor, the stopping and starting of movement of the vehicle can be accurately detected using the gyro output signal and the accurate offset value can be output.

According to one aspect of the present invention, if the variation of the average angular velocity is within the set range, the vehicle is stationary, and the difference between the currently fetched offset value fetched and a previously fetched offset value is within the allowable range, the average angular velocity is calculated and determined as the offset value. Thus, when the vehicle employing the vehicle speed sensor having the insensible zone at the low speed area travels at a low speed, update of the offset is prevented because the difference exceeds the allowable range. In addition, while the vehicle is turning on a turntable, the update of the offset is prevented because the difference exceeds the allowable range. Accordingly, it is possible to prevent the wrong offset value from being fetched.

BRIEF DESCRIPTION OF THE DRAWINGS

FIG. 11 is a diagram illustrating a correspondence between an elapsed time t and an allowable threshold $\Omega_{THL}$;

FIGS. 12A and 12B are diagrams illustrating offset voltage ($\Omega_{off}$) of a gyro;

DESCRIPTION OF THE PREFERRED EMBODIMENTS (A) First Embodiment

Figure 1A:
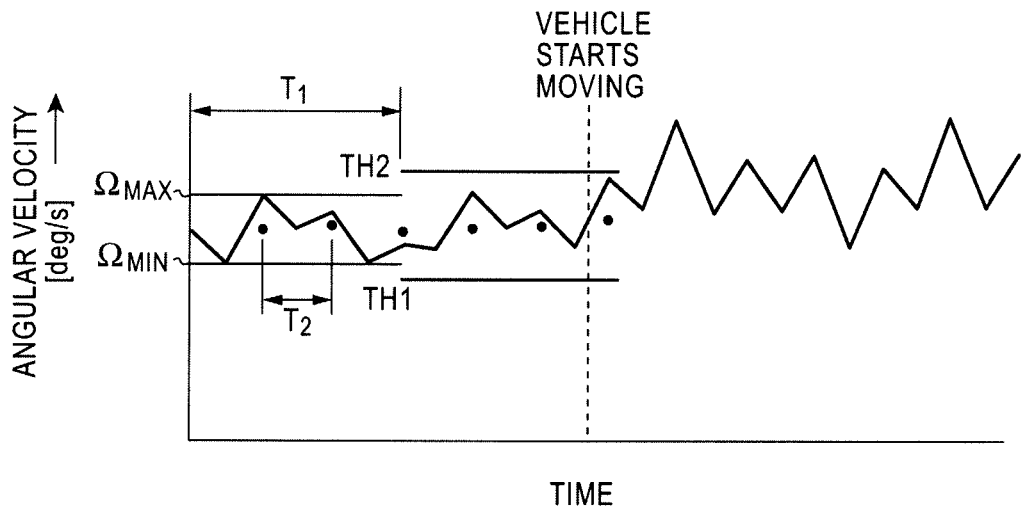
FIGS. 1A and 1B are diagrams illustrating angular velocity versus time.
Figure 1B:
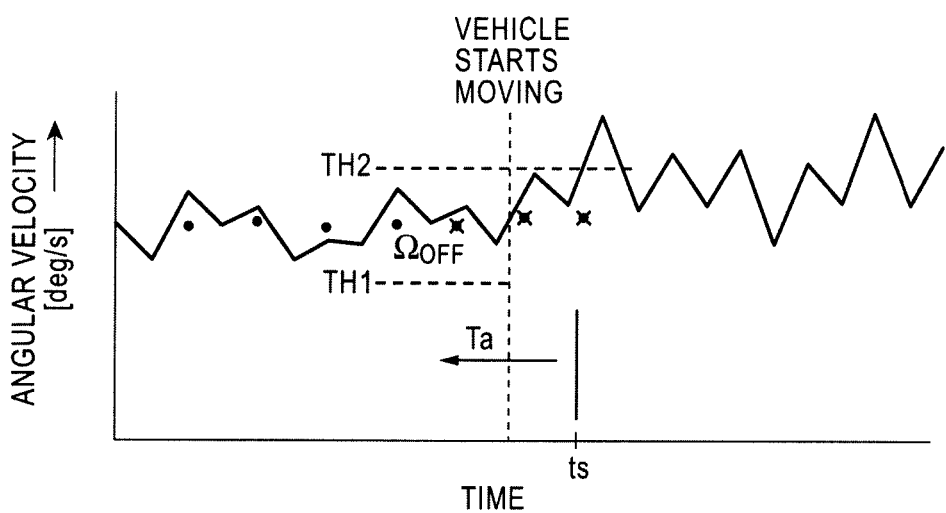

FIGS. 1A and 1B are diagrams illustrating angular velocity versus time. FIGS. 1A and 1B show an embodiment where a vehicle does not have a vehicle speed sensor. As shown in FIG. 1A, when a vehicle is stationary, a minimum value $\Omega_{MIN}$ and a maximum value $\Omega_{MAX}$ of an angular velocity signal output from a gyro during a predetermined period T1 (e.g., three seconds) are detected to determine thresholds TH1 and TH2 of a range of the angular velocity signal which is used to determine whether the vehicle is considered to be stationary. Suppose that the threshold TH1 is set to a value equivalent to a value 20 percent less of the minimum value $\Omega_{MIN}$, while the threshold TH2 is set to a value equivalent to a value 20 percent more of the maximum value $\Omega_{MAX}$ in consideration of a margin. A range between thresholds TH1 and TH2 is employed as a range of the angular velocity signal used to determine whether the vehicle is considered to be stationary.

Along with this, an average value (black dots shown in FIGS. 1A and 1B) of the angular velocity signal output from the gyro is calculated and stored at predetermined intervals T2 (e.g., one second). As shown in FIG. 1B, a time $t_s$ at which the angular velocity signal of the gyro exceeds the range between the thresholds TH1 and TH2 is detected as a movement start time. Offset values (denoted by symbol ×) within a set period Ta from the movement start detection time $t_s$ are discarded, and the average angular velocity signal $\Omega_{OFF}$ having been stored the set time Ta before the movement start detection time is fetched as the offset value and output.

Accordingly, the stationary range between TH1 and TH2 can be determined appropriately for each gyro, and the starting and stopping of the movement of the vehicle can be detected accurately. In addition, the average angular velocity signal $\Omega_{OFF}$ calculated the predetermined time Ta before the start of movement is determined as the offset value. Even in a case where a vehicle starts to move while a steering wheel of the vehicle is turned, or in a case where a vehicle travels at a low speed while slightly turning, credibility of the offset value can be improved since the offset values calculated at that time period are not used, which enables accurate direction detection while the vehicle is running.

In the above, whether a vehicle is considered stationary may be determined based on the range between TH1 and TH2 of the angular velocity signal, wherein the range is determined based on the minimum and maximum values of the angular velocity signal. Similar operations can be performed using a gyro output voltage signal in place of the angular velocity signal.

Figure 2:
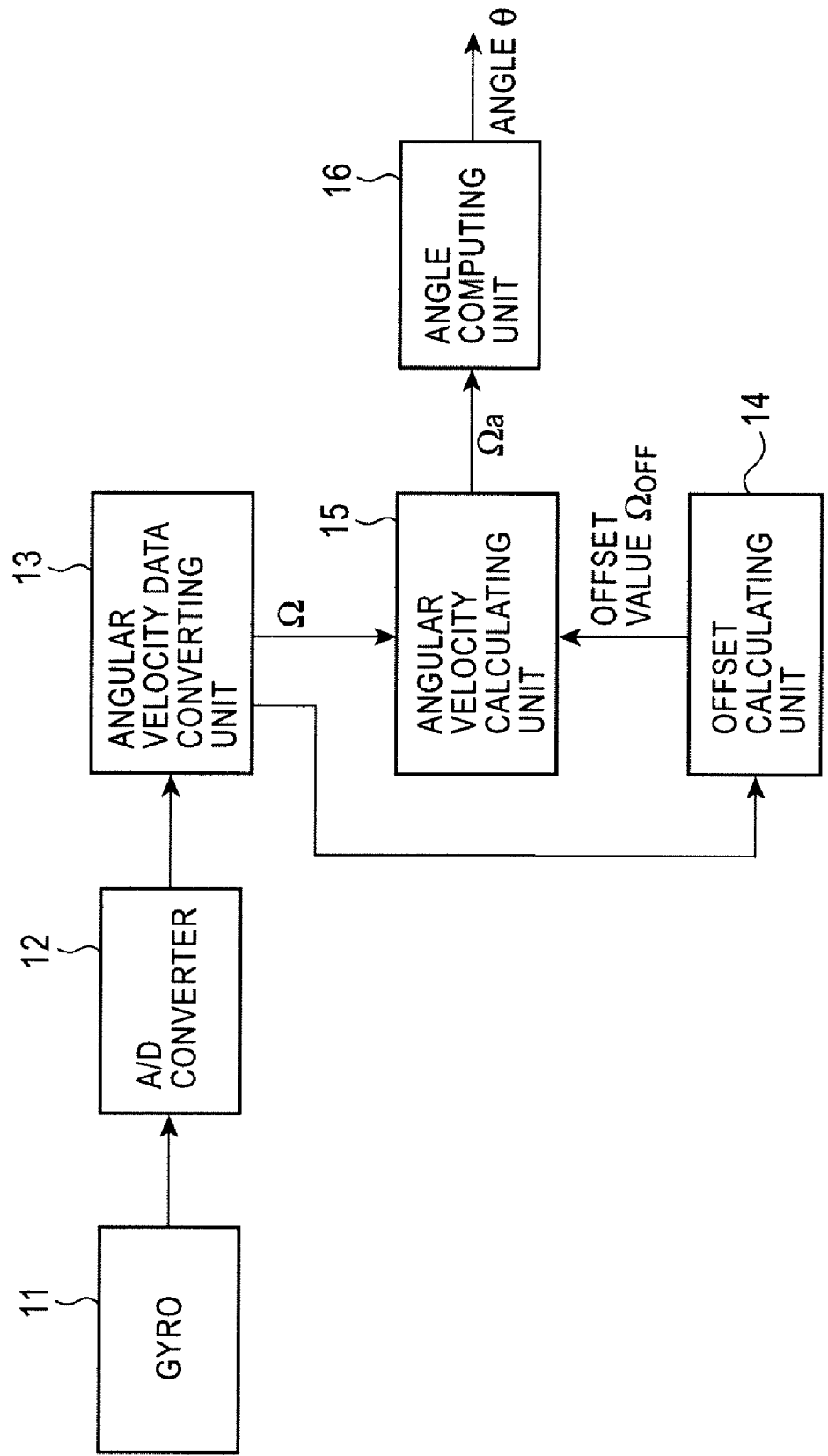
FIG. 2 is a diagram illustrating one embodiment of a configuration of an angular velocity calculating device.

FIG. 2 is a diagram illustrating a configuration of an angular velocity calculating device. A gyro 11 installed on the vehicle outputs signals corresponding to angular velocity of a vehicle or the like. An analog-to-digital (A/D) converter 12 digitalizes the analog signal output from the gyro 11. An angular velocity data converting unit 13 samples angular velocity data output from the A/D converter 12 several times, thereby averaging the data, and outputs the averaged angular velocity data to an offset calculating unit 14 and an angular velocity calculating unit 15. The gyro 11 generates a voltage signal of 25 mV per angular velocity of 1 degree/second (deg/sec). In one implementation, a zero-point voltage of the gyro 11 is determined to be 2.5V±300 mV. The A/D converter 12 may sample the voltage signal (the angular velocity signal) output from the gyro 11 at intervals of 5 msec to perform A/D conversion, and supply the digitalized value to the angular velocity data converting unit 13.

Figure 3:
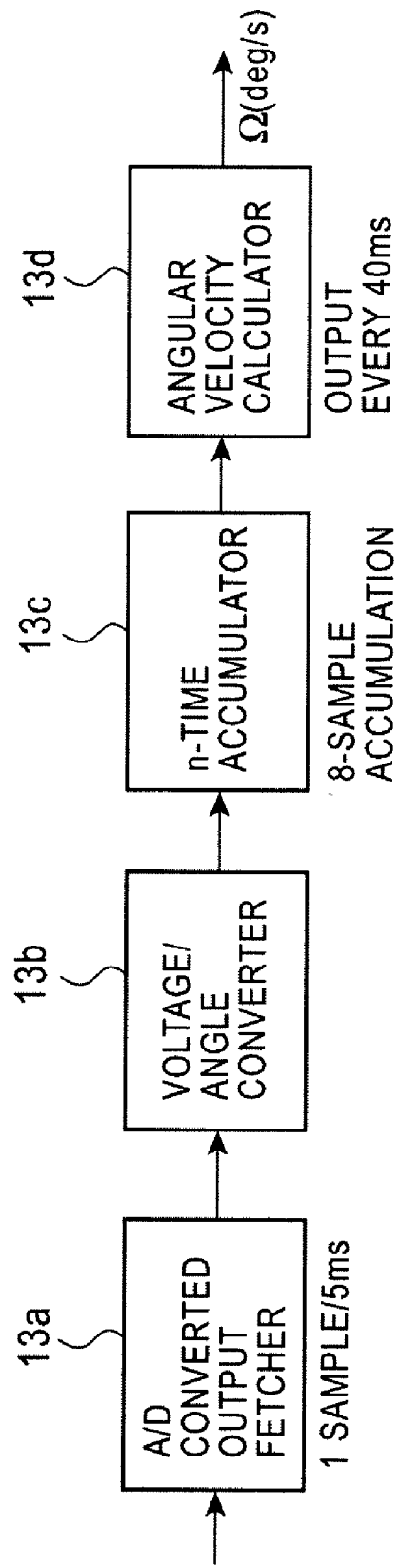
FIG. 3 is a diagram illustrating one embodiment of a configuration of an angular velocity data converting unit.

FIG. 3 is a diagram illustrating a configuration of the angular velocity data converting unit 13. An A/D converted output fetcher 13a fetches the A/D converted output. A voltage/angle converter 13b converts the voltage data into a rotation angle. An n-time accumulator 13c accumulates angles for n-time samples, e.g., eight samples, and supplies the angles to an angular velocity calculator 13d. The angular velocity calculator 13d calculates angular velocity $\Omega$ (deg/sec) on the basis of the supplied rotation angles for 40 msec (=5×8 msec). The angular velocity calculator 13d then supplies the angular velocity to the offset calculating unit 14 and the angular velocity calculating unit 15.

The offset calculating unit 14 determines an offset value ($\Omega_{OFF}$) using the angular velocity data output from the angular velocity data converting unit 13 while the vehicle is stationary, and supplies the offset value to the angular velocity calculating unit 15. The angular velocity calculating unit 15 supplies the angular velocity, obtained by canceling the offset value ($\Omega_{OFF}$) from angular velocity data ($\Omega$) output from the angular velocity data converting unit 13 while the vehicle is moving, to an angle computing unit 16. The angle computing unit 16 computes the rotation angle by integrating the angular velocity supplied from the angular velocity calculating unit 15.

Figure 4:
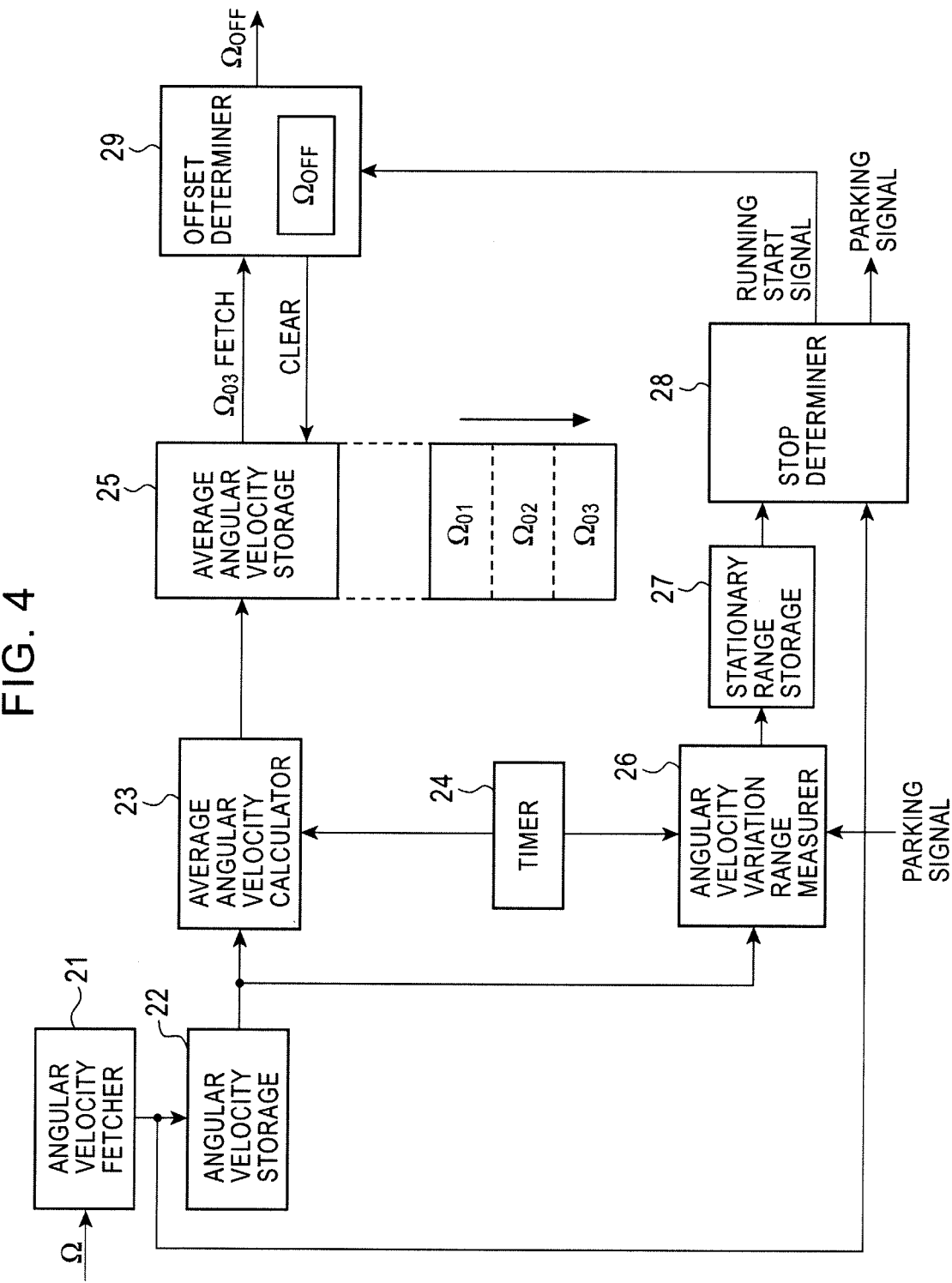
FIG. 4 is a diagram illustrating one embodiment of a configuration of an offset calculating unit.
Figure 5:
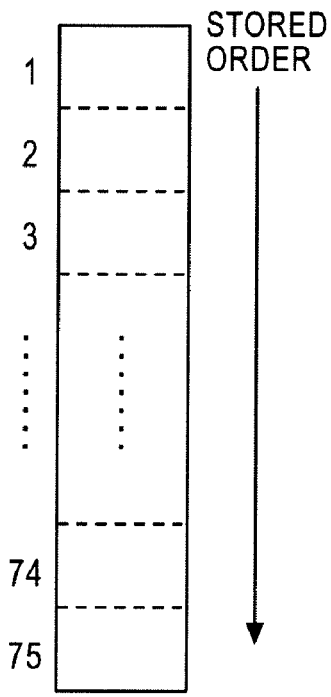
FIG. 5 is a diagram illustrating one embodiment of an angular velocity data storage method employed in an angular velocity storage.
Figure 6:
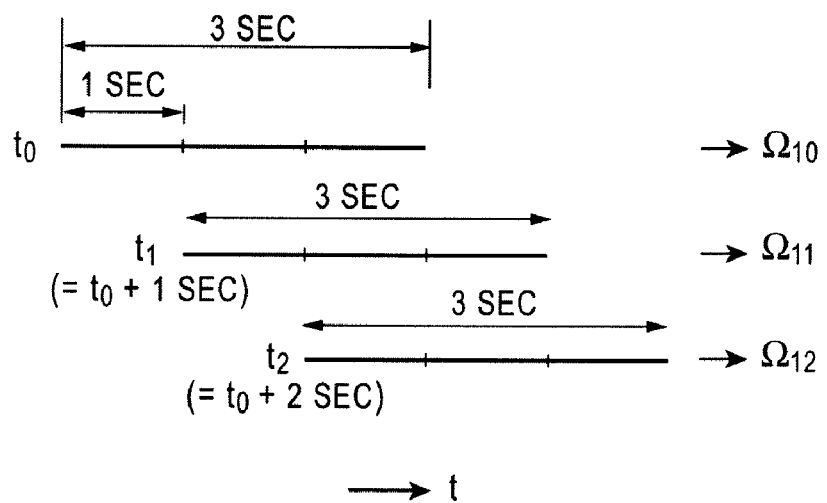
FIG. 6 is a diagram illustrating calculation of average angular velocity.

FIG. 4 is a diagram illustrating a configuration of the offset calculating unit 14. An angular velocity fetcher 21 fetches the angular velocity data supplied from the angular velocity data converting unit 13 every 40 msec and supplies the angular velocity data to an angular velocity storage 22. As shown in FIG. 5, the angular velocity storage 22 has areas 1 to 75 for storing the latest angular velocity data for three seconds and cyclically stores 75 angular velocity data in an order shown in the direction of an arrow. An average angular velocity calculator 23 calculates an average value of 75 latest angular velocity data for three seconds at intervals of one second on the basis of a timing signal supplied from a timer 24, and outputs the average value. FIG. 6 is a diagram illustrating calculation of the average angular velocity. At time $t_0$, an average value $\Omega_{10}$ of 75 latest angular velocity data for three seconds is calculated and output. At time $(t_0+1)$, i.e., one second after the time $t_0$, an average value $\Omega_{11}$ of 75 latest angular velocity data for three seconds is calculated and output. Furthermore, at time $(t_0+2)$, i.e., one second after the time $(t_0+1)$, an average value $\Omega_{12}$ of 75 latest angular velocity data for three seconds is calculated and output. Similarly, thereafter, an average value of 75 latest angular velocity data for three seconds is calculated and output at intervals of one second. An average angular velocity storage 25 sequentially stores m (three in the figure) latest average angular velocity data $\Omega_{01}$, $\Omega_{02}$, and $\Omega_{03}$ calculated by the average angular velocity calculator 23.

As described with reference to FIG. 1, an angular velocity variation range measurer 26 determines, every second while the vehicle is stationary, the minimum value $\Psi_{MIN}$ and the maximum value $\Omega_{MAX}$ from the 75 sample values for the past three seconds. The angular velocity variation range measurer 26 employs the value equivalent to a value 20 percent less of the minimum value and the value equivalent to a value 20 more of the maximum value as thresholds TH1 and TH2, respectively, and stores the range between the thresholds TH1 and TH2 as a range of angular velocity to determine whether the vehicle is considered to be stationary in a stationary range storage 27. In the stationary range storage 27, a relatively large angular velocity range is set as an initial value, which is updated every time the angular velocity range between the thresholds TH1 and TH2 is calculated.

A stop determiner 28 outputs a parking signal if the angular velocity signal fetched from the angular velocity data converting unit 13 is within the stationary range stored in the stationary range storage 27, whereas the stop determiner 28 generates a movement start signal if the angular velocity signal exceeds the stationary range. If the movement start signal is generated, an offset determiner 29 fetches the average angular velocity $\Omega_{03}$ having been calculated a predetermined time Ta (e.g., two seconds) before the generation time $t_s$ and having been stored in the average angular velocity storage 25 as the offset value $\Omega_{OFF}$ and outputs the offset value (see, FIG. 1). At the same time, the offset determiner 29 clears the content stored in the average angular velocity storage.

According to the first embodiment, even if a vehicle does not have a vehicle speed sensor, it is possible to accurately detect the stopping and the starting of movement of the vehicle using the gyro output signal and to calculate the accurate offset value.

(B) Second Embodiment

A second embodiment assumes an embodiment where a vehicle has a vehicle speed sensor. In the second embodiment, a vehicle is determined to be stationary if a vehicle pulse is not generated from the vehicle speed sensor for at least a predetermined period (e.g., 1.2 seconds).

In the second embodiment, whether or not the vehicle is stationary is determined based on the vehicle speed pulse generated by a vehicle speed sensor 51. If a variation of average angular velocity is within a set range, the vehicle is stationary, and a difference from an offset value fetched last time is within an allowable range, the latest average angular velocity is adopted as an offset value.

Figure 7:
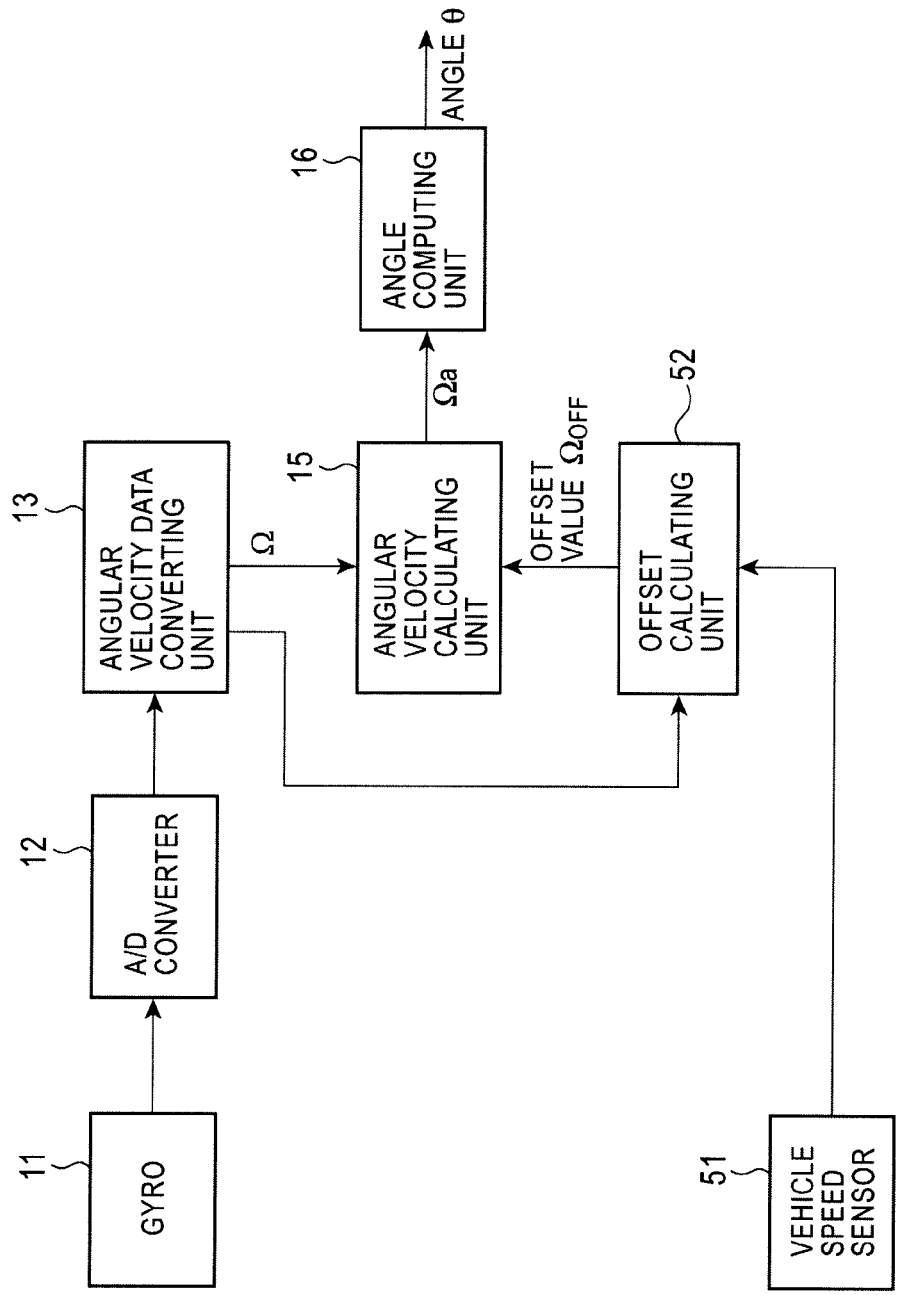
FIG. 7 is a diagram illustrating another embodiment of a configuration of an angular velocity calculating device.

FIG. 7 is a diagram illustrating a configuration of an angular velocity calculating device according to the second embodiment. The same units as those described in the first embodiment shown in FIG. 2 are denoted by the same numerals. The second embodiment differs from the first embodiment in that the vehicle speed sensor 51 is provided. The second embodiment further differs from the first embodiment in a configuration of an offset calculating unit 52. An angular velocity data converting unit 13 has the same configuration as that of the first embodiment shown in FIG. 3.

Figure 8:
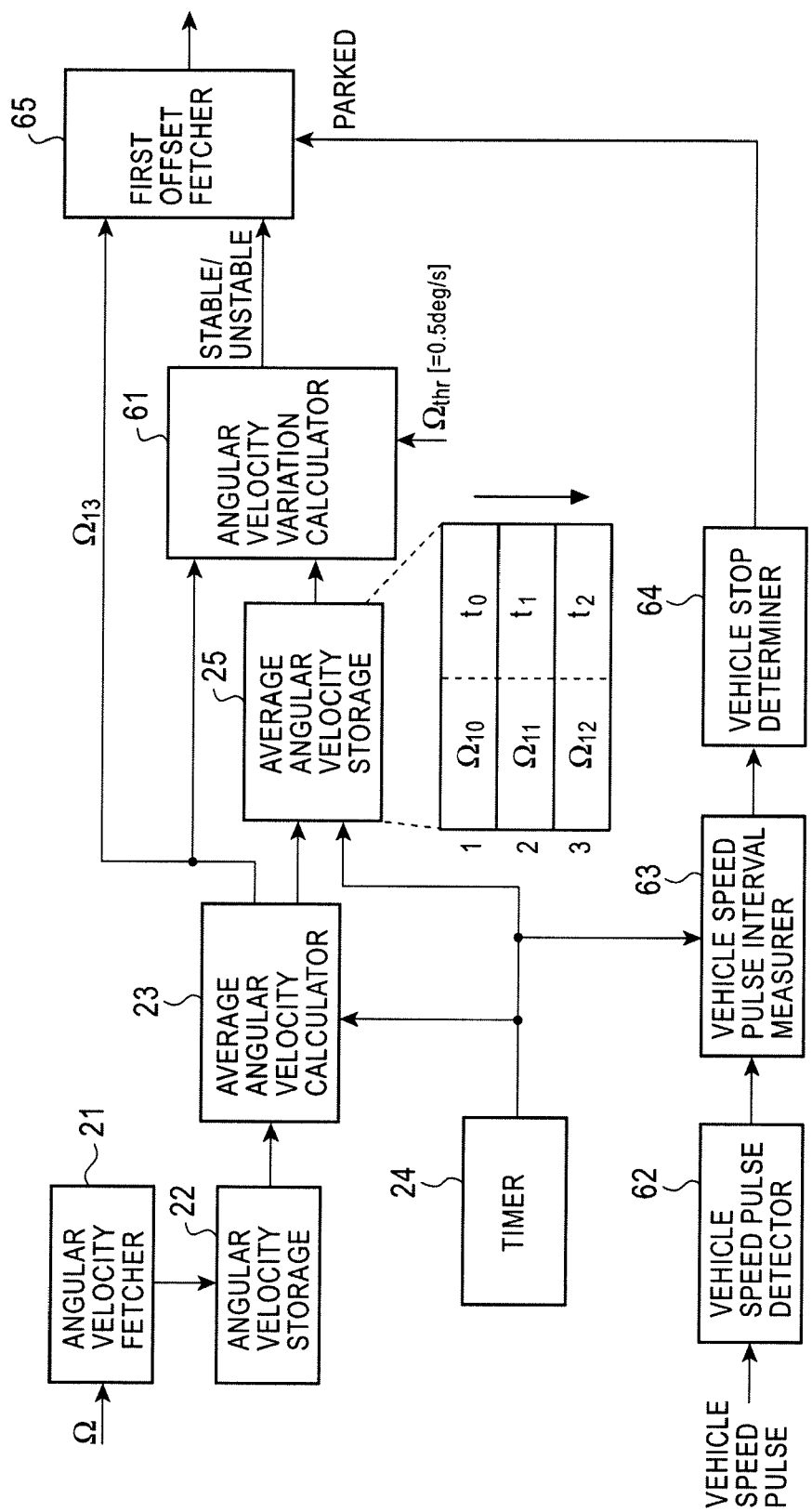
FIG. 8 is a diagram showing one embodiment of a configuration of an offset calculating unit (part 1)
Figure 9:
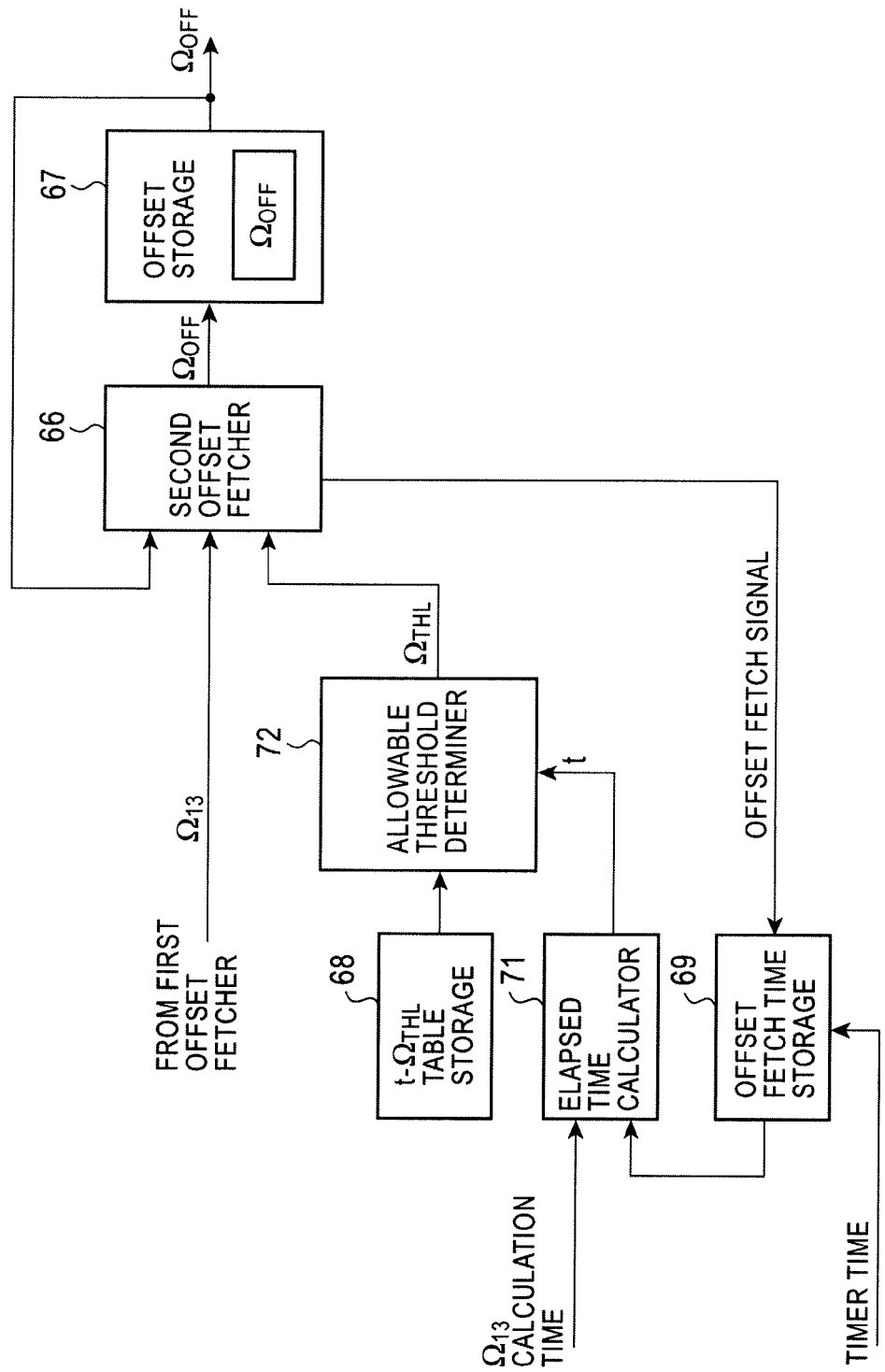
FIG. 9 is a diagram showing one embodiment of a configuration of an offset calculating unit (part 2)

FIGS. 8 and 9 are diagrams illustrating a configuration of the offset calculating unit 52 according to the second embodiment. The same components as those in the offset calculating unit according to the first embodiment shown in FIG. 4 are denoted by the same numerals. In one implementation, an angular velocity fetcher 21 fetches angular velocity data supplied from the angular velocity data converting unit 13 every 40 msec and supplies the angular velocity data to an angular velocity storage 22.

As shown in FIG. 5, the angular velocity storage 22 has areas 1 to 75 for storing the latest angular velocity data for three seconds and cyclically stores 75 angular velocity data in an order shown in the direction of an arrow. An average angular velocity calculator 23 calculates an average value of 75 latest angular velocity data for three seconds at intervals of one second on the basis of a timing signal supplied from a timer 24, and outputs the average value (see FIG. 6). An average angular velocity storage 25 sequentially stores (three in the figure) the latest average angular velocity data $\Omega_{10}$, $\Omega_{11}$, and $\Omega_{12}$ calculated by the average angular velocity calculator 23 and average angular velocity calculation times. An angular velocity variation calculator 61 determines the maximum difference between an average angular velocity $\Omega_{13}$ calculated this time and each of the average angular velocity data $\Omega_{10}$, $\Omega_{11}$, and $\Omega_{12}$ for the past three seconds having been stored in the average angular velocity storage 25. The angular velocity variation calculator 61 then determines whether the maximum difference is equal to, or smaller than, a set value, such as 0.5 deg/sec. If the maximum difference is not greater than the set value, the angular velocity variation calculator 61 outputs an angular velocity stable signal, while the angular velocity variation calculator 61 outputs an angular velocity unstable signal if the maximum difference is greater than the set value.

A vehicle speed pulse detector 62 detects vehicle speed pulses supplied from the vehicle speed sensor 51. A vehicle speed pulse interval measurer 63 measures intervals of vehicle speed pulses. A vehicle stop determiner 64 determines that the vehicle is stationary if the interval of the vehicle speed pulses is equal to, or greater than, the set value, e.g., 1.2 seconds, and outputs a parking signal.

A first offset fetcher 65 outputs the average angular velocity $\Omega_{13}$ calculated by the average angular velocity calculator 23 as a candidate offset value when the vehicle is stationary and the angular velocity stable signal is output. A second offset fetcher 66 (FIG. 9) fetches the average angular velocity signal $\Omega_{13}$ as the new offset value $\Omega_{OFF}$ if a difference (a change) between the average angular velocity signal $\Omega_{13}$ output from the first offset fetcher 65 and the offset value $\Omega_{OFF}$ fetched last time is not greater than the allowable threshold $\Omega_{THL}$, and supplies the offset value to an offset storage 67. The offset storage 67 holds and outputs the new offset value $\Omega_{OFF}$.

Figure 10:
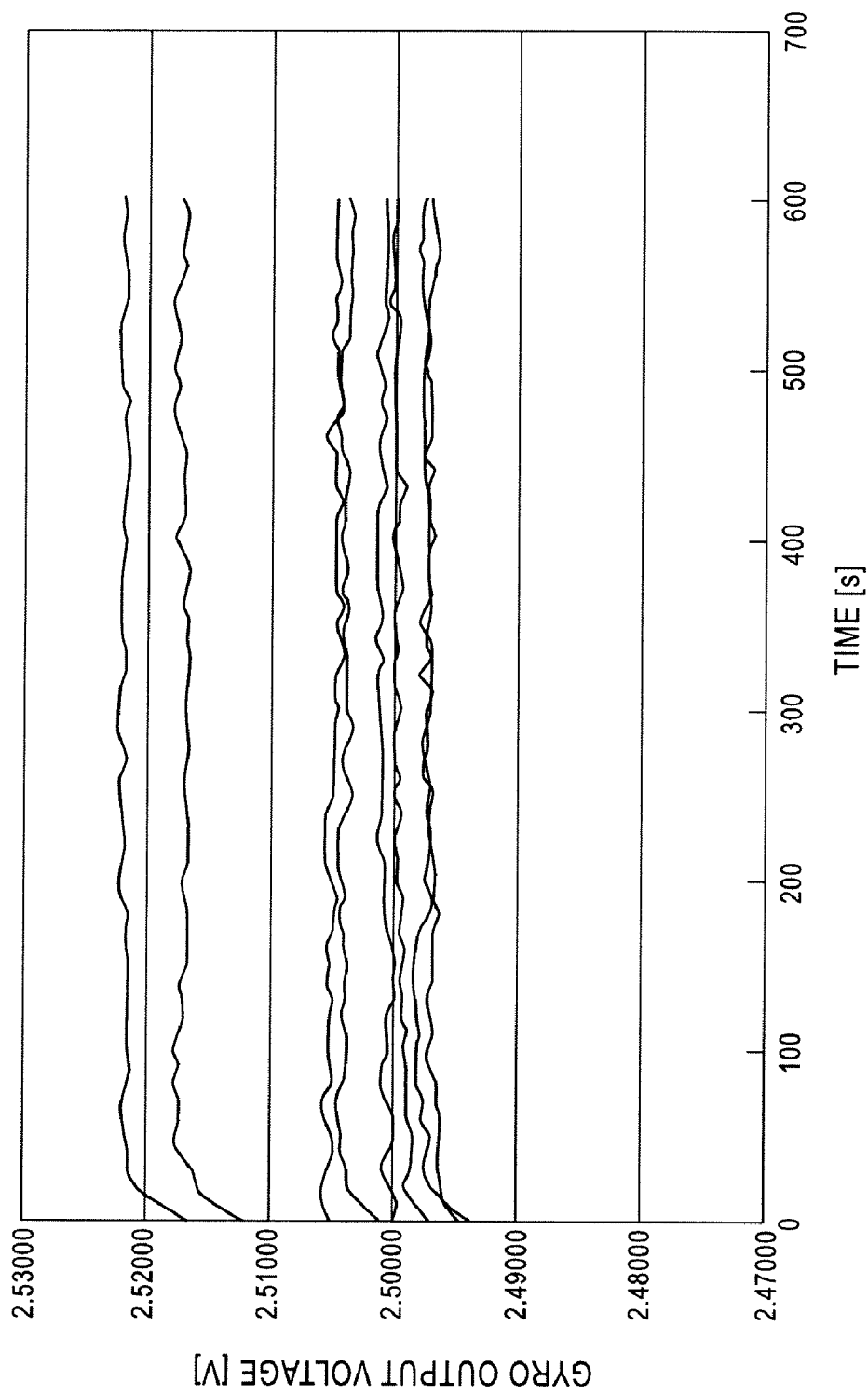
FIG. 10 shows characteristics on a relation between gyro output voltage and an elapsed time.
Figure 13A:
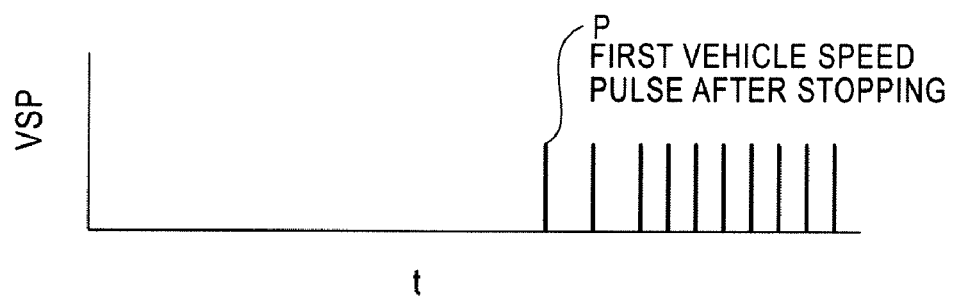
FIGS. 13A and 13B are diagrams illustrating a case where an offset value cannot be measured accurately when a vehicle is stationary.
Figure 13B:
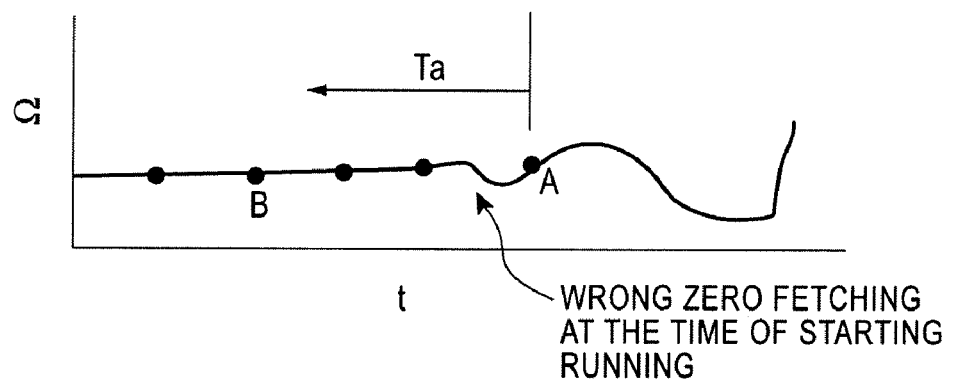

The allowable threshold $\Psi_{THL}$ is a value to be determined on the basis of the specification of the gyro or the capability of the gyro. If the vehicle is stationary, the difference does not exceed the allowable threshold $\Omega_{THL}$. Thus, if the difference exceeds the allowable threshold $\Omega_{THL}$, the vehicle can be considered not to be stationary. FIG. 10 shows characteristics obtained by measuring relations between gyro output voltage output when the vehicle is stationary and an elapsed time regarding some gyros. On the basis of these characteristics, a correspondence between the elapsed time t from the last offset fetch time and the allowable threshold $\Omega_{THL}$ is set as shown in FIG. 11 and is stored in a t-$\Omega_{THL}$ table storage 68. In a table shown in FIG. 11, a limitation is not provided for the allowable threshold $\Omega_{THL}$, when the elapsed time is equal to or greater than 300 seconds in order to allow a new offset value to be accurately calculated and output when the vehicle stops next time even if the change in the offset becomes large due to the temperature change or the like.

An offset fetch time storage 69 stores the time at which the second offset fetcher 66 fetches the average angular velocity signal as the offset value $\Omega_{OFF}$. An elapsed time calculator 71 calculates the elapsed time t from the last offset fetch time to the calculation time of the average angular velocity signal $\Omega_{13}$. An allowable threshold determiner 72 determines the allowable threshold $\Omega_{THL}$ corresponding to the elapsed time t on the basis of the data stored in the table storage 68, and supplies the allowable threshold to the second offset fetcher 66. As described above, the second offset fetcher 66 does not fetch the average angular velocity signal $\Omega_{13}$ as the offset value but discards the average angular velocity signal if the difference (the change) between the average angular velocity signal $\Omega_{13}$ output from the first offset fetcher 65 and the offset value $\Omega_{OFF}$ fetched last time is greater than the allowable threshold $\Omega_{THL}$. On the other hand, the second offset fetcher 66 fetches the average angular velocity signal $\Omega_{13}$ as the new offset value $\Omega_{OFF}$ and supplies the offset value to the offset storage 67 if the difference (the change) between the average angular velocity signal $\Omega_{13}$ and the offset value $\Omega_{OFF}$ fetched last time is not greater than the allowable threshold $\Omega_{THL}$.

Figure 14:
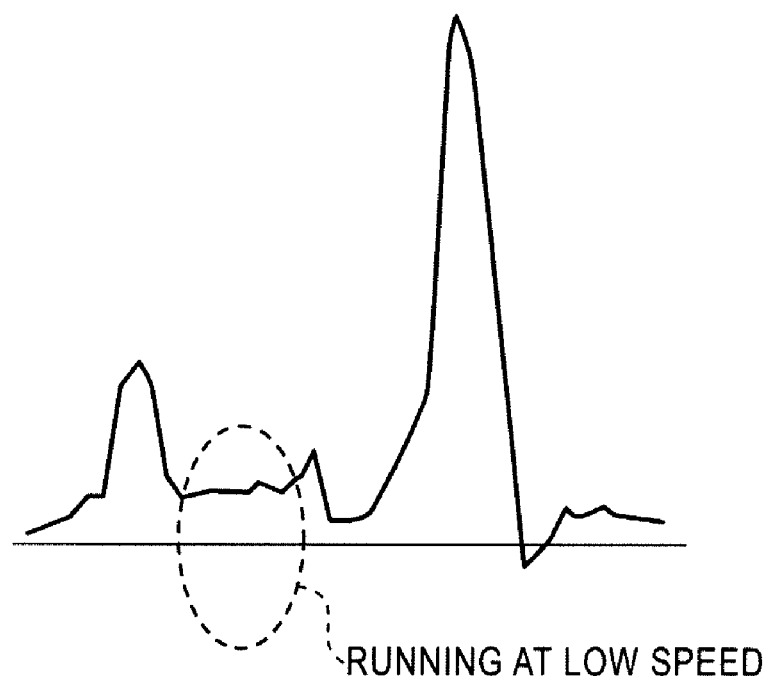
FIG. 14 is a diagram illustrating a case where a wrong offset value is employed when a vehicle runs at a low speed.

According to the second embodiment, even in the case where the vehicle is considered to be stationary because the vehicle speed pulse is not generated when the vehicle travels at the low speed after starting to move as shown in FIG. 14 and the maximum difference of the average angular velocity data is not greater than the set value (e.g., 0.5 deg/sec) and is stable, the deference between the current offset value $\Omega_{13}$ and the last offset value $\Omega_{OFF}$ exceeds the allowable threshold $\Omega_{THL}$ As a result, the offset value $\Omega_{13}$ is discarded and the wrong offset value is not output.

Figure 15:
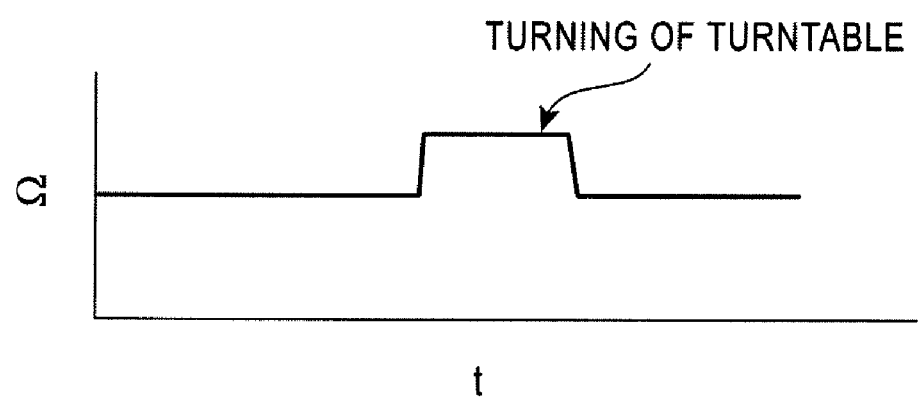
FIG. 15 is a diagram illustrating a case where a wrong offset value is employed when a vehicle turns on a turntable.
Figure 16A:
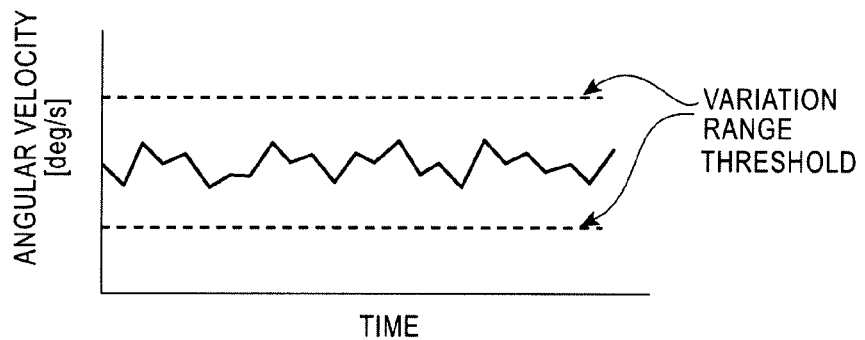
FIGS. 16A and 16B are waveform diagrams illustrating a case where noises are superimposed on gyro output signals when a vehicle is stationary.
Figure 16B:
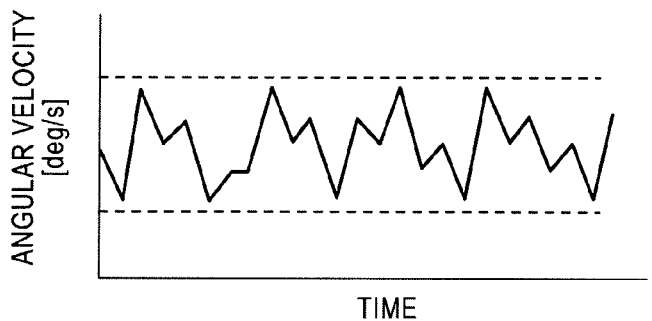
Figure 17:
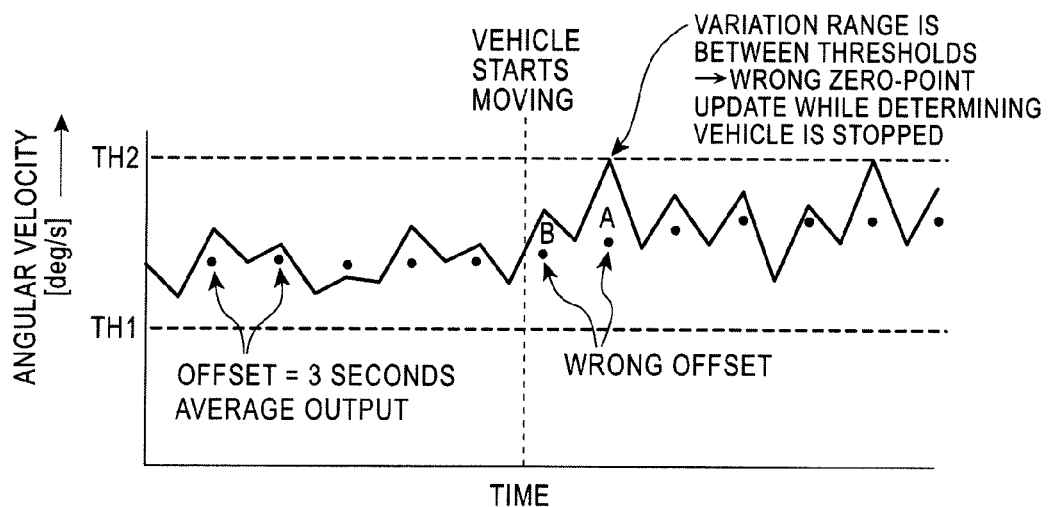
FIG. 17 is a diagram illustrating a variation width (a stationary range) on the basis of which a vehicle is considered to be stationary.

According to the second embodiment, even in the case where the vehicle is considered to be stationary because the vehicle speed pulse is not generated while the vehicle is turning on a turntable as shown in FIG. 15 and the maximum difference of the average angular velocity data is not greater than the set value (e.g., 0.5 deg/sec) and is stable, the deference between the current offset value $\Omega_{13}$ and the offset value $\Omega_{OFF}$ having been calculated before the vehicle turns on the turntable exceeds the allowable threshold $\Omega_{THL}$. As a result, the offset value $\Omega_{13}$ is discarded and the wrong offset value is not output.

According to the second embodiment, update of the offset value is prevented when a vehicle using a vehicle speed sensor having an insensible zone at a low speed area travels at a low speed and when the vehicle is turning on the turntable. Thus, the wrong offset value can be prevented.

It is therefore intended that the foregoing detailed description be regarded as illustrative rather than limiting, and that it be understood that it is the following claims, including all equivalents, that are intended to define the spirit and scope of this invention.

What is claimed is:

1. An angular velocity calculating device operative to determine an offset value based on an angular velocity signal that is output from a gyro while a vehicle is stationary and to determine an angular velocity while the vehicle is moving based on the offset value, the angular velocity calculating device comprising:
   a stationary range determiner configured to detect a minimum value and a maximum value of an angular velocity signal for a predetermined period T1 while a vehicle is stationary and to determine a range of the angular velocity signal used to identify when the vehicle is stationary;
   a stopping/starting determiner configured to determine that the vehicle starts to move when the angular velocity signal from a gyro exceeds the range and to determine that the vehicle is stationary when the angular velocity signal from the gyro is within the range;
   an angular velocity averager configured to calculate an average angular velocity value based on the angular velocity signal output from the gyro at predetermined time intervals;
   an angular velocity storage configured to store the average angular velocity output from the angular velocity averager; and
   an offset value determiner configured to determine an offset value based on the angular velocity stored at a set time before the stopping/starting determiner detects that the vehicle starts to move.

2. The device according to claim 1, further comprising:
   an angular velocity signal outputter configured to sample a voltage signal output from the gyro at predetermined intervals to determine rotation angles, and to add the rotation angles sampled for a predetermined number of times to output an angular velocity signal.

3. The device according to claim 1, wherein the stationary range determiner determines and updates the range of the angular velocity signal, wherein the range of the angular velocity signal is used to determine whether the vehicle is considered to be stationary at time intervals T2 that is shorter than the predetermined period T1.

4. The device according to claim 1, wherein the range used to determine whether the vehicle is considered to be stationary is a predetermined percentage that is greater than a range defined by the minimum value and the maximum value.

5. A vehicle stopping detecting device for detecting when a vehicle stops, comprising:
   a gyro configured to output an angular velocity signal of the vehicle;
   a stationary range determiner configured to detect a minimum value and a maximum value of the angular velocity signal for a predetermined period T1 while the vehicle is stationary and to determine a range of the angular velocity signal used to determine whether the vehicle is stationary; and
   a stopping/starting determiner configured to determine that the vehicle starts to move when the angular velocity signal from the gyro exceeds the stationary range and to determine that the vehicle is stationary when the angular velocity signal from the gyro is within the range.

6. The device according to claim 5, further comprising:
   an angular velocity signal outputter configured to sample a voltage signal output from the gyro at predetermined intervals to determine rotation angles, and to add the rotation angles sampled for a predetermined number of times to output an angular velocity signal.

7. The device according to claim 5, wherein the stationary range determiner determines and updates the range of the angular velocity signal, wherein the range of the angular velocity signal is used to determine whether the vehicle is considered to be stationary at time intervals T2 that is shorter than the predetermined period T1.

8. The device according to claim 5, wherein the range used to determine whether the vehicle is considered to be stationary is a predetermined percentage that is greater than a range defined by the minimum value and the maximum value.

9. An offset determination method comprising the steps of:
   detecting, with a stationary range determiner, a minimum value and a maximum value of an angular velocity signal for a predetermined period T1 while a vehicle is stationary and determining a range of the angular velocity signal used to determine when the vehicle is stationary;
   determining, with a stopping/starting determiner, that the vehicle starts to move when the angular velocity signal from a gyro exceeds the range and determining that the vehicle is stationary when the angular velocity signal from the gyro is within the range; and
   determining, with an offset determiner, an offset value based on the value of the angular velocity of the gyro at predetermined time intervals.

10. The method according to claim 9, further comprising the step of:
    sampling a voltage signal output from the gyro at predetermined intervals to determine rotation angles, wherein the angular velocity signal output from the gyro is based on the sampled rotation angles.

11. The method according to claim 9, further comprising the step of:
    determining and updating the range of the angular velocity signal at time intervals T2 that is shorter than the predetermined period T1.

12. The method according to claim 9, wherein the range of the angular velocity signal is a predetermined percentage greater than a range defined by the minimum value and the maximum value.

13. An angular velocity calculating device comprising:
    a stationary range determiner configured to detect a minimum value and a maximum value of an angular velocity signal for a predetermined period T1 while a vehicle is stationary and to determine a range of the angular velocity signal used to identify when the vehicle is stationary;
    a stopping/starting determiner configured to determine that the vehicle starts to move when the angular velocity signal exceeds the range and to determine that the vehicle is stationary when the angular velocity signal is within the range; and
    an offset value determiner configured to determine an offset value based on the angular velocity signal at predetermined time intervals.

* * * * *